United States Patent
Shen et al.

(10) Patent No.: US 11,483,353 B1
(45) Date of Patent: Oct. 25, 2022

(54) GENERATING ACCESS MANAGEMENT POLICIES FROM EXAMPLE REQUESTS

(71) Applicant: Amazon Technologies, Inc., Seattle, WA (US)

(72) Inventors: Jiasi Shen, Cambridge, MA (US); Homer Strong, Seattle, WA (US); Daniel George Peebles, Richland, WA (US); Neha Rungta, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/112,849

(22) Filed: Dec. 4, 2020

(51) Int. Cl.
*G06F 15/173* (2006.01)
*H04L 9/40* (2022.01)

(52) U.S. Cl.
CPC ............ *H04L 63/20* (2013.01); *H04L 63/102* (2013.01); *H04L 63/105* (2013.01)

(58) Field of Classification Search
CPC ............. H04L 63/0263; H04L 41/0806; H04L 41/0893
USPC ........................................................ 709/223
See application file for complete search history.

(56) References Cited

U.S. PATENT DOCUMENTS

| | | | |
|---|---|---|---|
| 9,544,294 B2 | 1/2017 | Srinivasan et al. | |
| 10,063,654 B2 | 8/2018 | Kirti et al. | |
| 10,255,061 B2 | 4/2019 | Lander et al. | |
| 10,469,314 B2 | 11/2019 | Ennis, Jr. et al. | |
| 11,032,287 B1 * | 6/2021 | Wang | H04L 63/102 |
| 2020/0120102 A1 | 4/2020 | Cybulski et al. | |
| 2021/0410051 A1 * | 12/2021 | Bouchet | H04W 88/08 |

* cited by examiner

*Primary Examiner* — Wing F Chan
*Assistant Examiner* — Andrew Woo
(74) *Attorney, Agent, or Firm* — S. Scott Foster; Kowert, Hood, Munyon, Rankin & Goetzel, P.C.

(57) ABSTRACT

Access management policies may be generated from example requests. An access management policy may be received. One or more example requests that have expected results when evaluated with respect to the access management policy may be received. Updates to the access management policy may be determined that cause the expected results to occur when a new version of the access management policy based on the updates is enforced. The new version of the access management policy may be generated based on the updates.

20 Claims, 9 Drawing Sheets

GENERATING ACCESS MANAGEMENT POLICIES FROM EXAMPLE REQUESTS

BACKGROUND

A cloud provider, or other provider network, may implement multiple network-based services. These services may provide different functionality, such as computational resources, storage resources, data transmission, among various others. Access controls to coordinate the identity and privileges of different users to obtain, use or otherwise manage resources from the network-based services may be implemented to secure the use of managed resources for authorized users.

Figure 1:
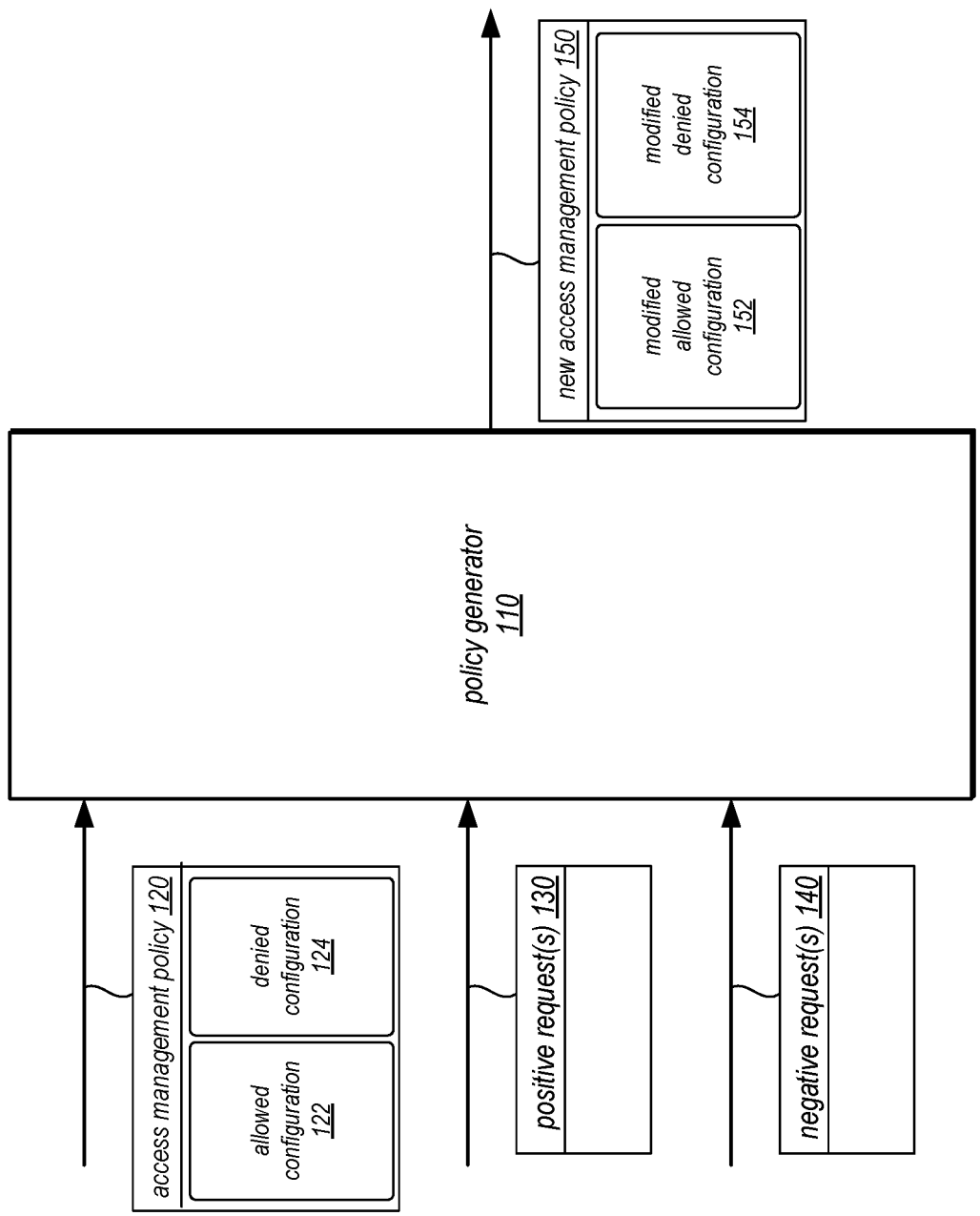
FIG. 1 illustrates a logical block diagram of generating access management policies from example requests, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for generating access management policies from example requests are described herein. Identity and access management systems may support various features to control access to resources hosted in other network-based services. Access management policies, for example, may specify various actions and effects with respect to resources in different network-based services in order to provide fine-grained access control, in various embodiments. Access management policies may be specified in various ways, in human-readable formats, such as JavaScript Object Notation or other system-specific policy languages (e.g., as supported by identity and access management service 210 in FIG. 2). As access to the number of resources and services managed through the use of access management policies increases, the complexity of creating new or edit policies to account for additional scenarios becomes more challenging.

For example, if certain type of application request for a resource were to fail because an access management policy was enforced that did not allow the request, it may be difficult for a user to determine how to modify the access management policy to allow the request. Techniques for generating access management policies from example requests, however, may be implemented in various embodiments that would take the example request as well as an expected result (e.g., the request being allowed), and automatically generate a new policy that when enforced would allow the request. Such techniques may prevent time-consuming, complicated, and error-prone manual edits (e.g., leading to unintended failure scenarios as a result of introduced errors). Moreover, automatic generation of access management policies may allow for policy simplification and other optimization techniques be applied, which may result in better understood and more effective access management policies that are generated.

FIG. 1 illustrates a logical block diagram of generating access management policies from example requests, according to some embodiments. Policy generator 110 may be implemented as part of an identity and access management (IAM) system (e.g., as discussed below with regard to FIG. 1) and/or as standalone application, which may be applicable to policies for an identity and access management system. As discussed in detail below with regard to FIGS. 2-5, policy generator 110 may implement various interfaces (e.g., policy generator interface 510 in FIG. 5), which may allow a user to provider or specify an existing access management policy 120, which may include various allowed actions in allowed configuration 122 as well as various denied actions in denied configuration 124. As discussed below, access management policy 120 may be specified in various formats, including but not limited to, human-readable formats, such as Javascript Object Notation (JSON), and/or domain-specific, service-specific or system-specific policy languages, such as a policy language supported by identity and access management service 210 in FIG. 2. In some embodiments, access management policy 120 may be an "empty" policy that has no existing content, which may be generated based on the positive request(s) 130 and negative request(s) 140.

Policy generator 110 may also receive positive request(s) 130. Positive request(s) 130 may be examples of requests that specify one or more actions with respect to one or more resources with an expected result of being allowed by the new access management policy 150. Similarly, policy generator 110 may receive negative request(s) 140. Negative request(s) may be examples of requests that specify one or more actions with respect to one or more resources with an expected result of being denied by the new access management policy 150. Different combinations of positive requests 130 and/or negative requests 140 may be used by policy generator 110 to generate new access management policy 150, including scenarios with only positive requests 130 (or a single positive request 130), only negative request(s) 140 (or a single negative request 140), and some combination of the same or different numbers of both positive 130 and negative 140 requests.

Policy generator 110 may apply various techniques to generate new access management policy 150 that includes a modified allowed configuration 152 and/or modified denied configuration 154, such as the techniques discussed below with regard to FIGS. 3-4 and 6-8. In some embodiments, policy generator 110 may detect conflicts with other access management policies that are inform or are otherwise invoked by example positive 130 and negative requests 140 in order to identify those scenarios where a modification to another policy may have to be performed in order to achieve a desired result for the example requests. Policy generator 110 may provide new access management policy 150 via various types of interfaces for display and/or further editing.

The previous description of a policy generator in FIG. 1 is a logical illustration and thus is not to be construed as limiting as to the architecture for implementing a policy generator.

This specification begins with a general description of a provider network that implements an identity and access management service that generates access management policies from example requests. Then various examples of the identity and access management service including different components/modules, or arrangements of components/module that may be employed as part of implementing the identity and access management service are discussed. A number of different methods and techniques to implement generating access management policies from example requests are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
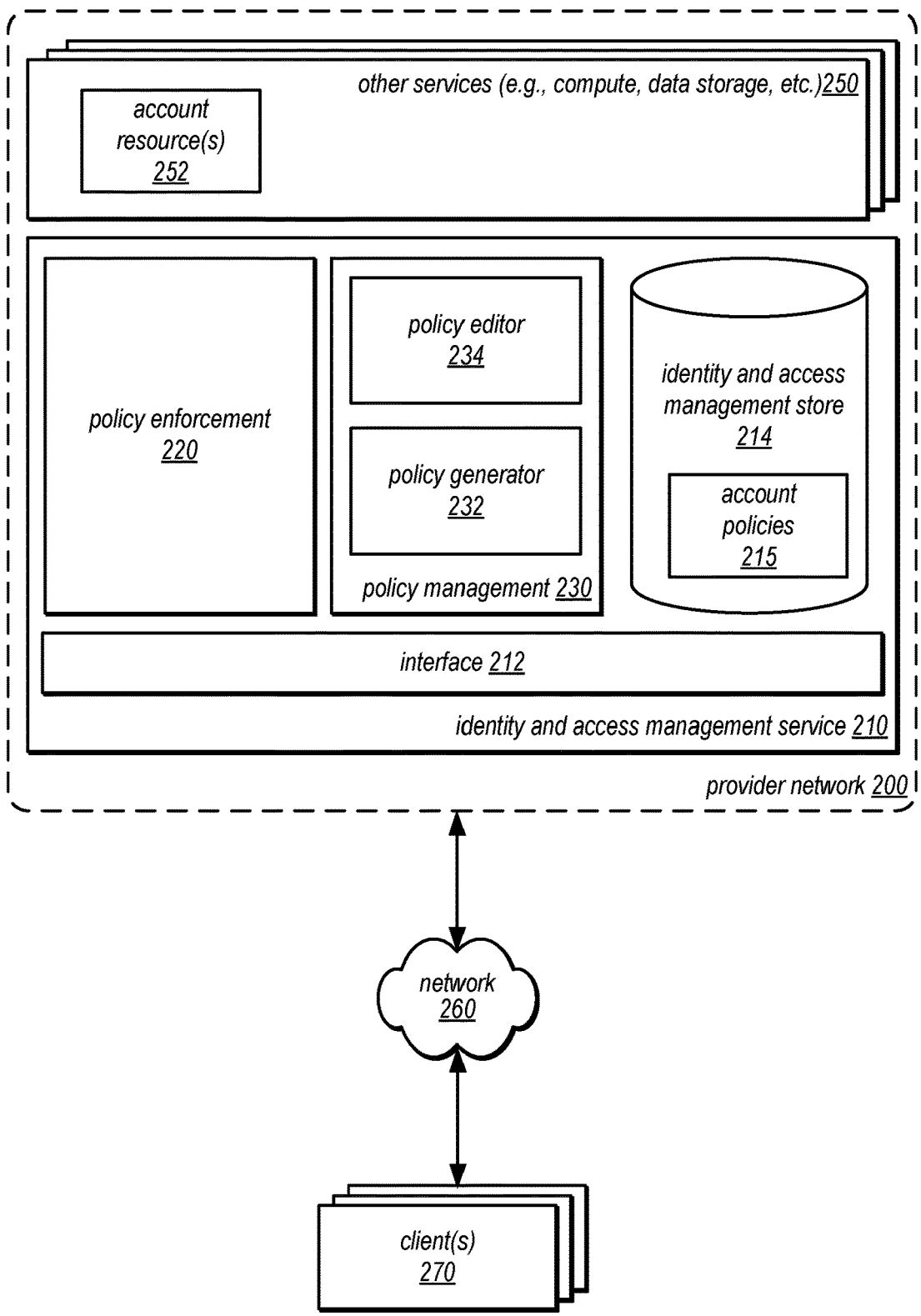
FIG. 2 is a logical block diagram illustrating a provider network implementing an identity and access control management service that implements policy generation using example requests, according to some embodiments.

FIG. 2 is a logical block diagram illustrating a provider network implementing an identity and access control management service that implements policy generation using example requests, according to some embodiments. In various embodiments, a provider network 200 may be a private or closed system or may be set up by an entity such as a company or a public sector organization to provide one or more services (such as various types of cloud-based storage, processing, or other computing resources) accessible via the Internet and/or other networks to clients 270. The provider network may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, such as provider network regions, where a region may be a separate geographical area in which the provider network clusters or manages data centers, in some embodiments. Each region 200 may include two or more availability zones (sometimes referred to as fault tolerant zones) connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Clients 270 can connect to availability zones of the provider network via a publicly accessible network (e.g., the Internet, a cellular communication network). Regions may be connected to a global network which includes private networking infrastructure (e.g., fiber connections controlled by the cloud provider) connecting each region to at least one other region. The provider network may deliver content from points of presence outside of, but networked with, these regions 200 by way of edge locations and regional edge cache servers. This compartmentalization and geographic distribution of computing hardware enables the provider network to provide low-latency resource access to customers on a global scale with a high degree of fault tolerance and stability.

In some embodiments, a provider network may implement various computing resources or services across one or more regions, such as identity and management service 210 and other services 250, which may include a virtual compute service, data processing service(s) (e.g., map reduce, data flow, and/or other large scale data processing techniques), data storage services (e.g., object storage services, block-based storage services, database services, or data warehouse storage services) and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network 200, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 illustrated in FIG. 9 and described below. In various embodiments, the functionality of a given system or service component (e.g., a component of identity and access management services 210 or other services 250) may be implemented by a particular node or may be distributed across several nodes. In some embodiments, a given node may implement the functionality of more than one service system component (e.g., more than one data store component).

Identity and access management service 210 may policy generation techniques, as discussed above with regard to FIG. 1 and below with regard to FIGS. 3-8. Identity and access management service 210 may provide operators of other services 250 with the ability to enforce access controls for various types of users and various roles of users associated with an account according to the identity determined for and shared by identity and access management service 210. For example, identity and access management service 210 can provide fine-grained access controls to different service resources, support different authentication techniques or protocols, such as multi-factor authentication (MFA), support analysis or tools for specifying access controls, and integration features for external or alternative identity and access control mechanisms, in some embodiments. User controls may be implemented to determine what, wherein, and when users can access resources and how the resources may be used by users, including federated users to provide management for groups of users and/or roles which may support features like single sign-on (SSO), in some embodiments.

Identity and access management service 210 may implement interface 212. Interface 212 may be a programmatic interface (e.g., supporting one or more APIs), graphical (e.g., providing a web-based console or other graphical control), and/or command line interfaces, in various embodiments, to allow for the specification and management of various identity and access management service 210 features, including creating, editing, and generating access management policies as discussed below with regard to FIGS. 3-5 for performing access operations.

Identity and access management service 210 may implement policy enforcement 220, in various embodiments. For example, various access control management policies may be specified and enforced for different account resource(s) 252 in other services 250. Policy enforcement 220 may serve as an authorization and access control for various requests, operations, or other actions taken with respect to account resources by various users, accounts, roles, and/or other identities by enforcing access management policies according to the various features specified in the access management policies. For example, policy enforcement 220 may interpret these policies, determine whether and what resources and actions are within the scope of a policy and provide access control information to other services in order for other services to allow or deny requests directed to account resource(s) 252. Identity and access management store 214 may store the created and enforced account policies 215, in various embodiments.

In various embodiments, policy management 230 may implement policy editor 234. As discussed in detail below with regard to FIGS. 3-5, various interfaces and/or interactions may be used to allow users to create, edit, and/or remove access management policies. In this way, users can take advantage of the flexible and customizable features of access control policies to tailor access control management for specific scenarios in an account. Policy editor 234 may, in some embodiments, invoke policy generator 232, in order to generate or provide a policy to policy editor 234.

Figure 5:
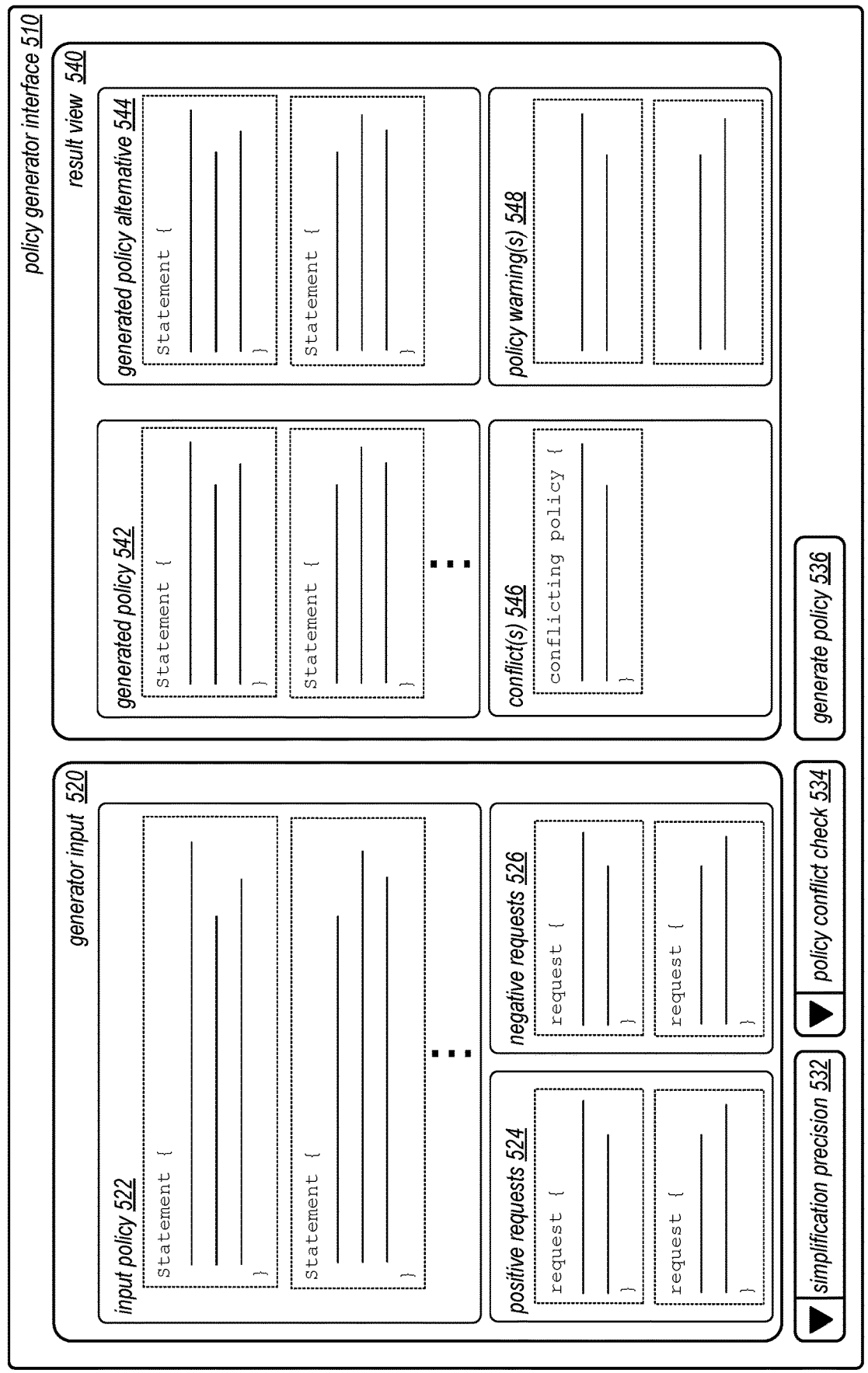
FIG. 5 illustrates an example user interface for a policy generator, according to some embodiments.

Because errors in policies can lead to unintended consequences when enforced (e.g., being overly permissive or restrictive upon operations), policy management 230 may implement policy evaluator 232, in some embodiments. In this way, policy evaluator 232 can provide a user with feedback to correct, modify, or optimize that would otherwise lead to undesirable outcomes when a given access management policy was enforced. FIG. 5 provides a detailed discussion of policy evaluation including the use of resource state information to provide context-sensitive and dynamic evaluation of policies that adapts and optimizes policy evaluation different across different accounts.

Generally speaking, clients 270 may encompass any type of client configurable to submit network-based requests to provider network regions 200 via network 260, including requests for other services 250 (e.g., a request to create a database, start a computation job, setup a data stream, etc.). In some embodiments, operators of a service (e.g., service 250) may be a client 270 that performs requests to specify quorum controls and/or access control operations, in some embodiments. For example, a given client 270 may include a suitable version of a web browser, or may include a plug-in module or other type of code module configured to access a management console to specify quorum controls and/or access control operations. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with provider network region 200. In some embodiments, client 270 may be configured to generate network-based services requests according to a Representational State Transfer (REST)-style network-based services architecture, a document- or message-based network-based services architecture, or another suitable network-based services architecture. Although clients 270 are illustrated as external to provider network 200, in some embodiments clients of different services, like other services 250, can be implemented within provider network region 200 (e.g., implemented on a resource of another service 250, such as virtual compute instance).

Clients 270 may convey network-based services requests to and receive responses from provider network regions 200 via network 260. In various embodiments, network 260 may encompass any suitable combination of networking hardware and protocols necessary to establish network-based-based communications between clients 270 and provider network regions 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network region 200. It is noted that in some embodiments, clients may communicate with provider network region 200 using a private network rather than the public Internet.

Figure 3:
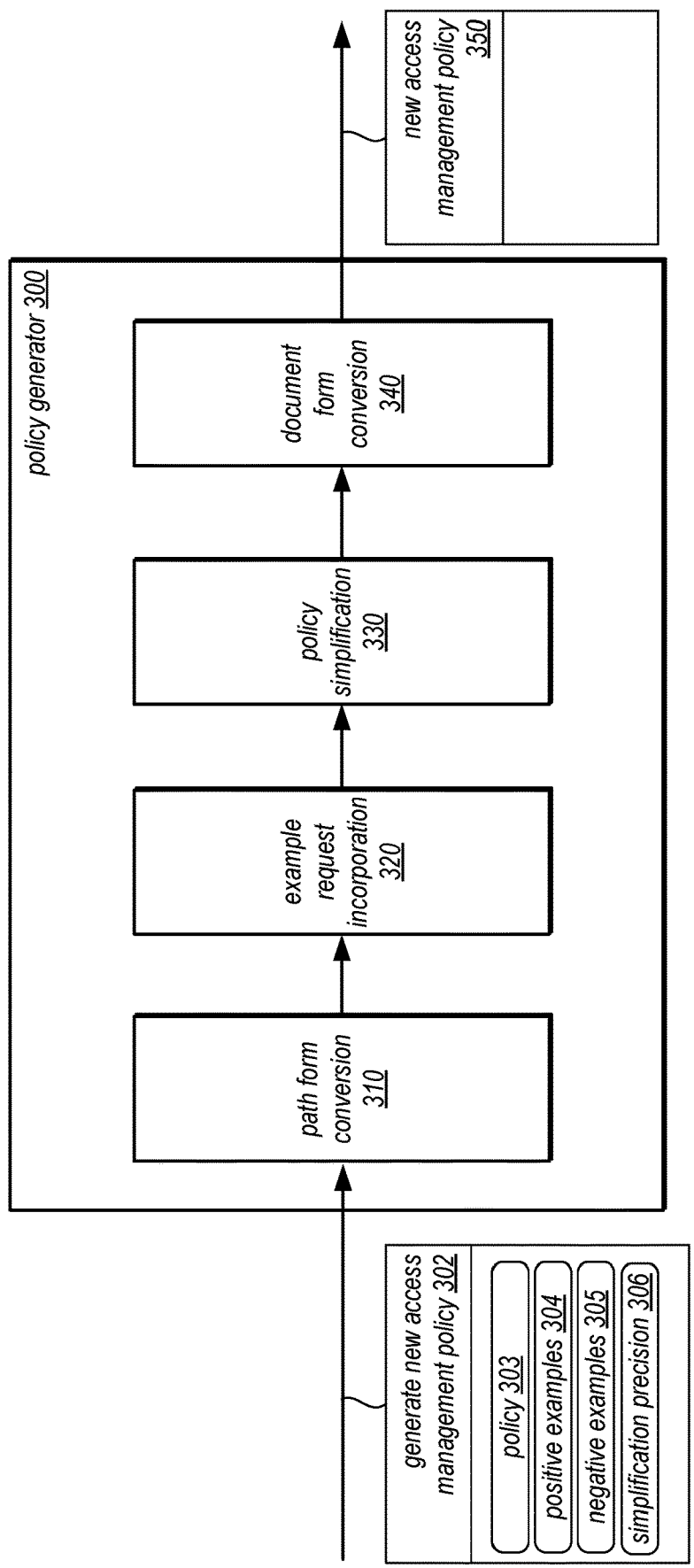
FIG. 3 is a logical block diagram illustrating an example policy generator that generates a new access management policy from example requests, according to some embodiments.

FIG. 3 is a logical block diagram illustrating an example policy generator that generates a new access management policy from example requests, according to some embodiments. Policy generator 300 may be implemented as part of identity and access management service 210, as discussed above in FIG. 2 or as a standalone application, in some embodiments. Policy generator 300 may receive, via an interface, a request to generate a new access management policy 302 that may include a policy 303 (or an identifier to lookup or obtain the policy), zero, one, or multiple positive examples 304, zero, one, or multiple negative examples 305, and, in some embodiments, a simplification precision indicator, as discussed below.

In various embodiments, policies may include various features included in one or more statements, such as action (e.g., service actions allowed or denied by a policy), effect (e.g., allows or denies actions), resource (e.g., resource identifier, name or other information which the policy is attached), principal (e.g., an account, user, role, or other mechanism for making access decisions to allow or deny, among others (e.g., policy language version, conditions, identifiers for statements, etc.). These features of a policy can be specified and then evaluated according to the various techniques discussed below.

In various embodiments, path form conversion 310 may generate an access management policy into disjoint paths, as discussed in detail below with regard to FIGS. 6-7. In various embodiments, policy generator 300 may implement example request incorporation 320, in various embodiments. Example request incorporation 320 may for each positive request, add a new Allow statement and/or shrink an existing Deny statement in the policy 302 as needed. For each negative request, example request incorporation 320 may add a new Deny statement in the policy as needed.

In various embodiments, policy simplification 330 may identify possible simplifications by merging paths in the generated policy. In some embodiments, policy simplification 330 may then prune or remove various features according to the simplification parameter, as discussed below with regard to FIG. 7. For example, policy simplification may remove features without changing permissions or may remove features, providing a more permissive policy (that still satisfies the expected results of the example requests) and return warning information that identifies how permissions have changed. Policy generator 300 may implement document form conversion 340 to transform the simplified version of the policy from path form into a document form (e.g., a text format in the policy language), which may then be provided as the new access management policy 350.

Figure 4:
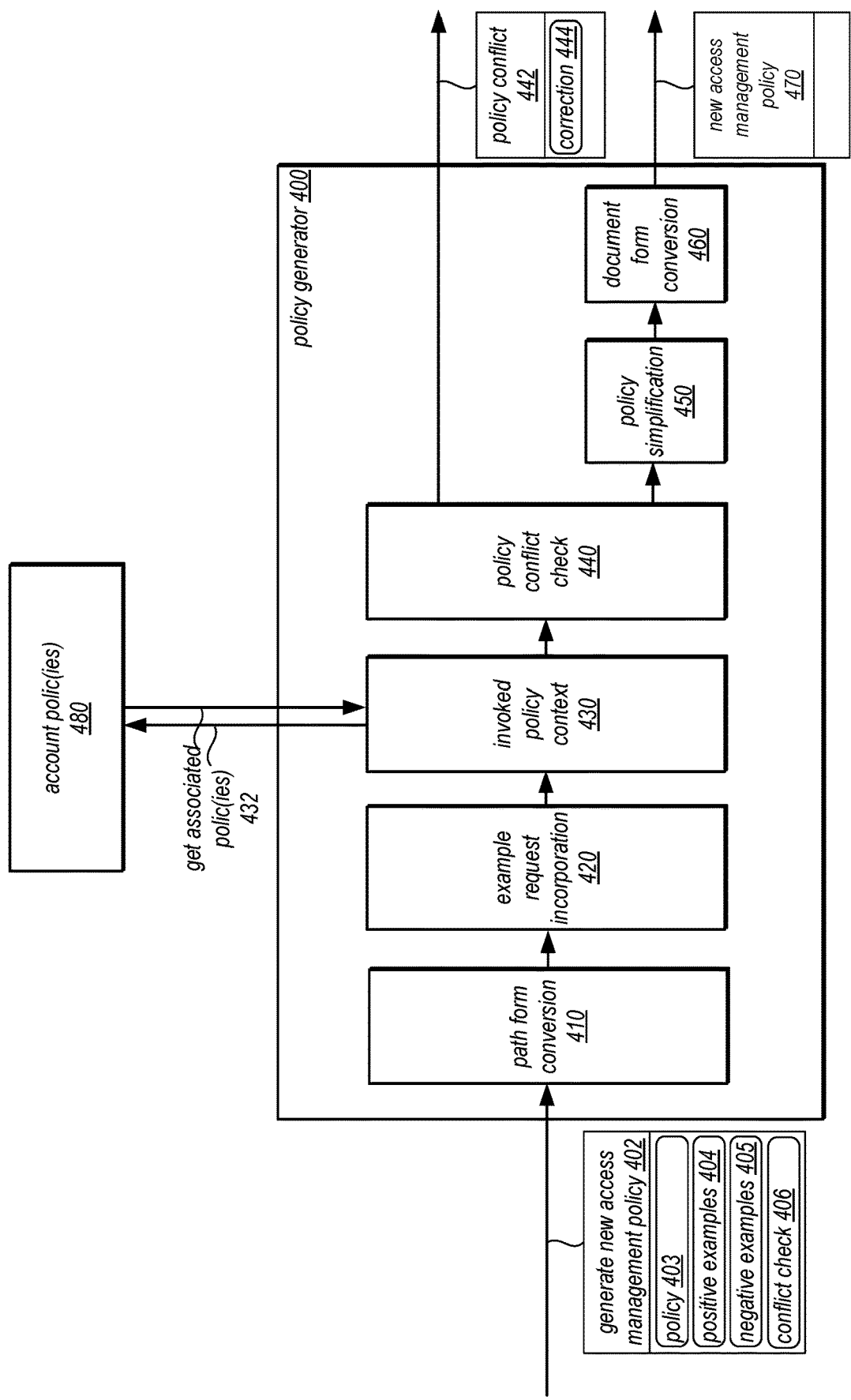
FIG. 4 is a logical block diagram illustrating an example policy generator that detects conflicts between a generated access management policy and invoked access management policy, according to some embodiments.

As noted above, in some embodiments, conflicts can arise between a policy being generated and other policies which may have an effect on requests evaluated using the generated policy, such as the provided example requests. FIG. 4 is a logical block diagram illustrating an example policy generator that detects conflicts between a generated access management policy and invoked access management policy, according to some embodiments. Similar to FIG. 3, policy generator 400 may be implemented as part of access management policy service 210, in some embodiments, or separately. Policy generator 400 may receive, via an interface, a request to generate a new access management policy 402 that may include a policy 403 (or an identifier to lookup or obtain the policy), zero, one, or multiple positive examples 404, zero, one, or multiple negative examples 405, and a parameter to perform a conflict check, as indicated at 406.

In various embodiments, path form conversion 410 may generate an access management policy into disjoint paths, as discussed in detail below with regard to FIGS. 6-7. In various embodiments, policy generator 400 may implement example request incorporation 420. Example request incorporation 420 may for each positive request, add a new Allow statement and/or shrink an existing Deny statement in the policy 402 as needed. For each negative request, example request incorporation 420 may add a new Deny statement in the policy as needed.

In various embodiments, policy generator 400 may implement invoked policy context 430, in some embodiments. For example, invoked policy context 430 may get 432 account polic(ies) 480 based on the request to identify any other policies applicable to the example requests. For example, service-wide or resource policies may be applicable depending on the resource being targeted in the request or account-wide policies may be identified according to an identity of the user in the request. Invoked policy context may then add further paths to the converted new policy to be considered together by policy conflict check 440.

Policy conflict check 440 may compare the added paths for invoked or otherwise applicable policies to the paths generated for the new policy to check for blocks. Block paths may, for instance, illustrate when an action with respect to a resource cannot have the expect result because of a countervailing path from the invoked policy context. Policy conflict check 440 may send an indication of a policy conflict 442, in some embodiments. In some embodiments, a correction 444 to the conflicting policy may be suggested.

For policies that do not have a conflict, policy generator 400 may proceed with other features. For example, policy simplification 450 may identify possible simplifications by merging paths in the generated policy. In some embodiments, policy simplification 450 may then prune or remove various features according to the simplification parameter, as discussed below with regard to FIG. 7. For example, policy simplification may remove features without changing permissions or may remove features, providing a more permissive policy (that still satisfies the expected results of the example requests) and return warning information that identifies how permissions have changed. Policy generator 400 may implement document form conversion 460 to transform the simplified version of the policy from path form into a document form (e.g., a text format in the policy language), which may then be provided as the new access management policy 470.

FIG. 5 illustrates an example user interface for a policy generator, according to some embodiments. Policy generator interface 510 may provide a graphical interface policy generators 300 and/or 400, in some embodiments. For example, generator input 520 may provide an input policy 522 element, which may allow user to enter a policy text or upload, link to a policy. Generator input may include input elements to specify positive requests 524 and negative requests 526. Various other generator parameters, such as simplification precision 532 and whether to perform a policy conflict check 534 may be provided using various use interface elements (e.g., drop down menus).

After selecting the input to generate the policy 536, various results may be displayed in result view 540. For example, one or multiple generated policies, 542 and 544 may be displayed (e.g., according to simplified and non-simplified versions). As indicated at 546 conflict(s) may be displayed as well as policy warnings 548 which may illustrate a change in policy scope.

In at least some embodiments, display or providing of different generated policies may be occur interactively based on one or more requests. For example, an initial policy generation request may specify a low (or no) simplification. Then, a second request may cause the generation and display of a simplified version of the new policy. Then a third request may cause the generation and display of a simplified version of the new policy with a high precision parameter. In this way, a user could move between displays of multiple versions of a policy in order to see the effect of different selected options (e.g., different simplification parameters), in some embodiments.

Although FIGS. 2-5 have been described and illustrated in the context of an identify and access management service, the various techniques and components illustrated and described in FIGS. 2-5 may be easily applied to other access control systems in different embodiments for one or multiple different systems or services, which may be public or private. As such, FIGS. 2-5 are not intended to be limiting as to other embodiments of a system that may implement resource state evaluation of access management policies.

Various different systems and devices may implement the various methods and techniques described below, either singly or working together. For example, an identity and access management service such as described above with regard to FIGS. 2-4 may be configured to implement the various methods. Therefore, the above examples and or any other systems or devices referenced as performing the illustrated method, are not intended to be limiting as to other different components, modules, systems, or configurations of systems and devices.

Figure 6:
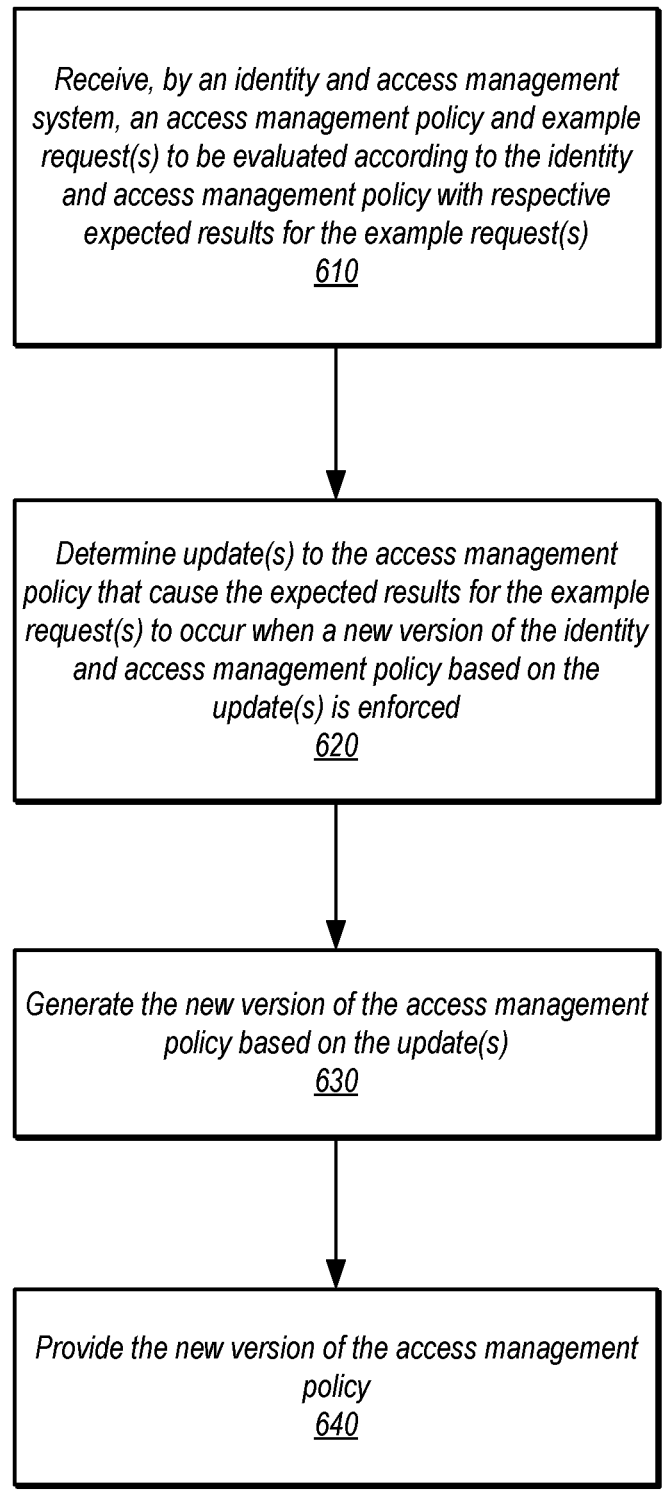
FIG. 6 is a high-level flowchart illustrating various methods and techniques to implement generating access management policies from example requests, according to some embodiments.
Figure 7:
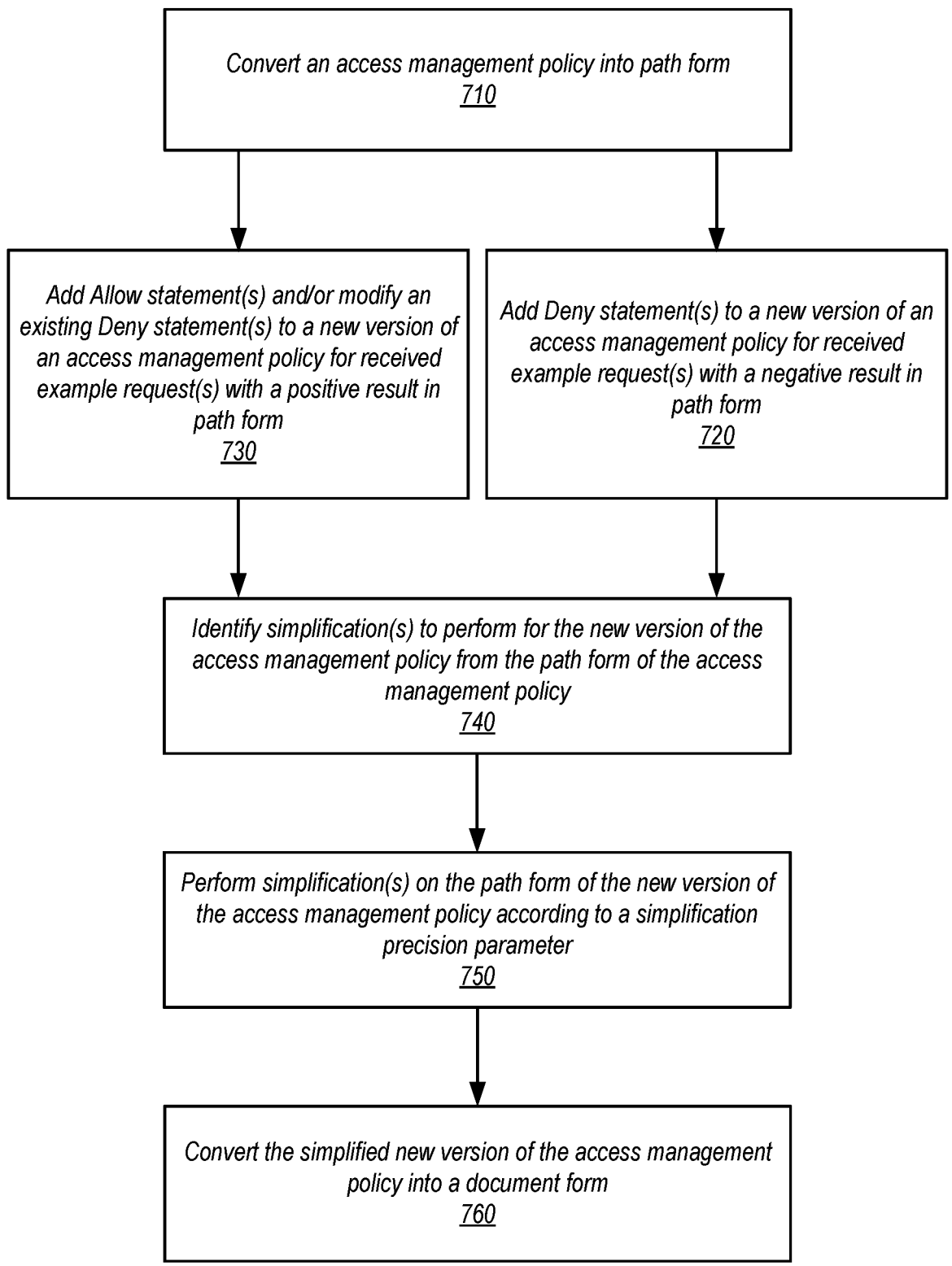
FIG. 7 is a high-level flowchart illustrating various methods and techniques to implement determining updates that would cause results from example requests in a generated access management policy, according to some embodiments.

FIG. 6 is a high-level flowchart illustrating various methods and techniques to implement resource state evaluation of access management policies, according to some embodiments. As indicated at 610, an access management policy and example request(s) to be evaluated according to the access management policy with respective expected results for the example requests may be received, in various embodiments. For example, a current access management policy "P" as well as list of one or more positive requests "Rp" and a list of one or more negative requests "Rn" may be received.

As indicated at 620, update(s) to the access management policy that cause the expected results for the example requests to occur when a new version of the access management policy based on the updates is enforced may be determined, in various embodiments. For example, the new version of the policy may differ from the old policy by allowing the positive requests and denying the negative requests. When a request is both positive and negative, it will be denied by the new policy. Thus, in some embodiments, the new policy P' may satisfy:
{requests allowed by P'}=({requests allowed by P}U Rp)\Rn.

In some embodiments, updates may also simplify an initially generated policy using the example requests according to a simplification parameter, as discussed in detail below with regard to FIG. 7. For example, an "equivalent" simplification parameter may automatically simplify an initially generated policy by removing redundant features without changing the generated policy's permissions. In some embodiments, an "aggressive" simplification parameter may simplify the initially generated policy to be shorter and more permissive than the initially generated policy (but still providing the explicitly request positive and negative request results). Warning information may be provided to indicate how the simplified policy has become more permissive, in some embodiments.

As indicated at 630, the new version of the access management policy may be generated based on the determined updates, in various embodiments. For example, the identified updates along with various simplifications or other optimizations may be combined to recreate a new policy document in the policy language, in some embodiments. As indicated at 640, the new version of the policy may be provided, in some embodiments. For example, various interfaces, programmatic, graphical, and/or textual (e.g., command line), may display the new version of the access management policy.

In various embodiments, including the policy generation techniques discussed above and below, some rules, assumptions, and/or other criteria for a policy language that defines an access management policy may be used or relied upon. In some embodiments, the policy language may specify that each action/resource literal may contain at most one wildcard character at the end, and that there are no conditions in policies. For example, let ACTION be the set of action literals. Let RESOURCE be the set of resource literals.

For handling wildcards (e.g. "*") in a policy language, in various embodiments it may be the case that
ACTION:=('a'| ... |'z')+('*')?
RESOURCE: =('a'| ... |'z'|'0'| ... |'9'|'/')+('*')?
These actions and resources may be case-insensitive. An action may be in, in some embodiments, alphabetic characters, followed by an optional wildcard. A resource may be, in some embodiments, alphanumeric characters and the slash character, followed by an optional wildcard.

To relax this assumption in some policy generation techniques, a set of literals L with a subtraction operator SUB may be found such that, for any literals l1, l2∈L:
SUB(l1,l2) is a finite subset of L,
{s|s matches l for some l∈SUB(l1,l2)}={s|s matches l1}−{s|s matches l2}. Then, use L to replace the definition for ACTION or RESOURCE.

In various embodiments, example requests may have the following abstract grammar:
REQUEST:=ACTION RESOURCE (KEY VALUE)*
A request R=<a, r, [<k1, v1>, ..., <k1, v1>]>∈REQUEST may consist of an action a∈ACTION, a resource r∈RESOURCE, and a list of key-value pairs.

If a wildcard is present in an example positive/negative requests, these requests may be first pre-processed by rewriting them until literals are disjoint, similar to the pre-processing of policies discussed below.

In various embodiments, policies may have the following abstract grammar:
POLICY:=STMT*
STMT:=EFFECT ACTION+RESOURCE+CONDITION*
EFFECT:='Allow' 'Deny'
CONDITION:=OP KEY VALUE+
A policy P∈POLICY may consist of a list of statements.

In various embodiments, a statement S=<e, [a1, ..., an], [r1, ..., rm], [<o1, k1, v1>, ..., <o1, k1, v1>]>∈STMT may consist of an effect e∈EFFECT, a list of actions [a1, ..., an], a list of resources [r1, ... rm], and a list of conditions [<o1, k1, v1>, ..., <o1, k1, v1>]. An effect may be either allow or deny. A condition may consist of an operator, a key, and some values.

In various embodiments, semantics may be request R=<a, r, [<k1, v1>, ..., <k1, v1>]>∈REQUEST matches a statement S=<e, [a1, ..., an], [r1, ..., rm], [<o1, k1, v1'>, ..., <o1, k1, v1'>]>∈STMT if the following hold:
  There exists integer i ($1<=i<=n$) such that a matches ai,
  There exists integer i ($1<=i<=m$) such that r matches ri, and
  For all integer i ($1<=i<=1$), the check of v1 v1' evaluates to true.
A request R∈REQUEST may be allowed by a policy P∈POLICY if the following hold:
  R matches at least one allow statement in P,
  R does not match any deny statement in P.

To work with conditions, in various embodiments, actions and resources may be treated as two fields. Treat each condition as an additional field that may also be conjuncted together. In such a scenario, a path may contain not only the action and resource fields but also all of the relevant condition fields. In this way, conditions may be included in the paths.

In view of the above considerations, techniques for generating a new version of a policy based on example requests may be performed. FIG. 7 is a high-level flowchart illustrating various methods and techniques to implement determining updates that would cause results from example requests in a generated access management policy, according to some embodiments. As indicated at 710, an access management policy may be converted into path form, in some embodiments. For example, a policy generator may:
  a) Collect the set of distinct actions/resources in the policy. Rewrite until disjoint, using the SUB operator
  b) Initialize an empty set of paths
  c) For each statement <Allow, [a1, ..., an], [r1, ..., rm]> in P, for all integers i, j such that $1<=i<=n$ and $1<=j<=m$, add path <ai, rj> to the set
  d) For each statement <Deny, [a1, ..., an], [r1, ..., rm]> in P, for all integers i, j such that $1<=i<=n$ and $1<=j<=m$, remove path <ai, rj> from the set if exist.

As indicated at 730, allow statement(s) and/or modify an existing Deny statement(s) may be added to create a new version of an access management policy for received example requests with a positive (e.g., allowed) result in the path form of the access management policy (as discussed above), in various embodiments. As indicated at 720, similarly, Deny statement(s) may be added to create a new version of an access management policy for received example requests with a negative (e.g., denied) result in the path form of the access management policy (as discussed above), in various embodiments.

As indicated at 740, simplification(s) in the policy may be identified for the new version of the access management policy from the path form of the access management policy. For example, a policy generator may:
  a) Identify paths that can be merged without changing semantics.
  b) Identify paths that can be merged aggressively, which changes the semantics. Calculate the resulting path differences as the extra permissions.
  c) Convert each merging option into a new policy.

As discussed above, simplification precision parameters may be received, in some embodiments, to determine how much to optimize or condense a new version of a policy being generated. As indicated at 750, simplifications may be performed on the path form of the new version of the access management policy according to a simplification precision parameter. For example, a policy generator may:
  a) Use a precision parameter to prune the list of literals
  b) If a simplification changes the semantics, report the extra permissions as a warning.

As noted discussed above, to allow positive requests, a policy generator may relax a provided policy so that it allows positive requests. In order to perform simplification, the amount of relaxing performed on the policy may be reduced. For example, consider an old policy P, a set of positive requests Rp, and a policy P'" obtained from steps 710 and 720 above. P may be relaxed minimally if the following holds:
  {requests allowed by P'"}={requests allowed by P}∪Rp.
Relaxing the policy minimally may produce a new policy that exceeds a size limits for policies, in some embodiments. Also, the new policy may contain many literals that appear haphazard or distracting to a reader of the new policy. Therefore, the simplification precision parameter may be used to tune how much detail to drop from the new policy.

In some embodiments, the precision parameter may be set to multiple different values (e.g., High, Medium, and Low). High precision may produce the minimally relaxed policy in full detail. Medium precision may prune action literals by the valid action names (e.g., in host service documentation) and prune resource literals by the resources used elsewhere in the old policy. Low precision may first prunes literals as with Medium and then prune them further by picking a top number (e.g., 5) based on how well they match the valid action names/used resource names. Note that the precision heuristics may be different in different use cases or scenarios.

In various embodiments, the following example algorithm that relaxes an old policy P minimally to allow one positive request R:
  a) If P allows R, return P.
  b) If P implicitly denies R, return P'", where P'" is P with a new Allow statement that uses R's action and resource.
  c) If P explicitly denies R, get the Deny statement in P that denies R and relax it as follows.
    i. If R's action and resource is identical to some of the statement literals: Use De Morgan's laws to split the statement into an equivalent set of smaller statements, then remove the one that matches only R. See the first figure below as an example.
    ii. If R's action or resource matches a statement literal with wildcards: Split the statement literal into an equivalent set of more concrete literals, so that one of them is identical to R's action/resource. Then perform step 3a. See the second figure below as an example, where we omit literals that do not match legal action names.
Then use the resulting policy to recursively call this algorithm, obtain policy P'" from the recursion, and return P'".

As indicated at 760, the simplified new version of the access management policy may be converted back into a document form, in some embodiments. For example, the various paths may be traversed in order to generate the corresponding new version of the access management policy.

Figure 8:
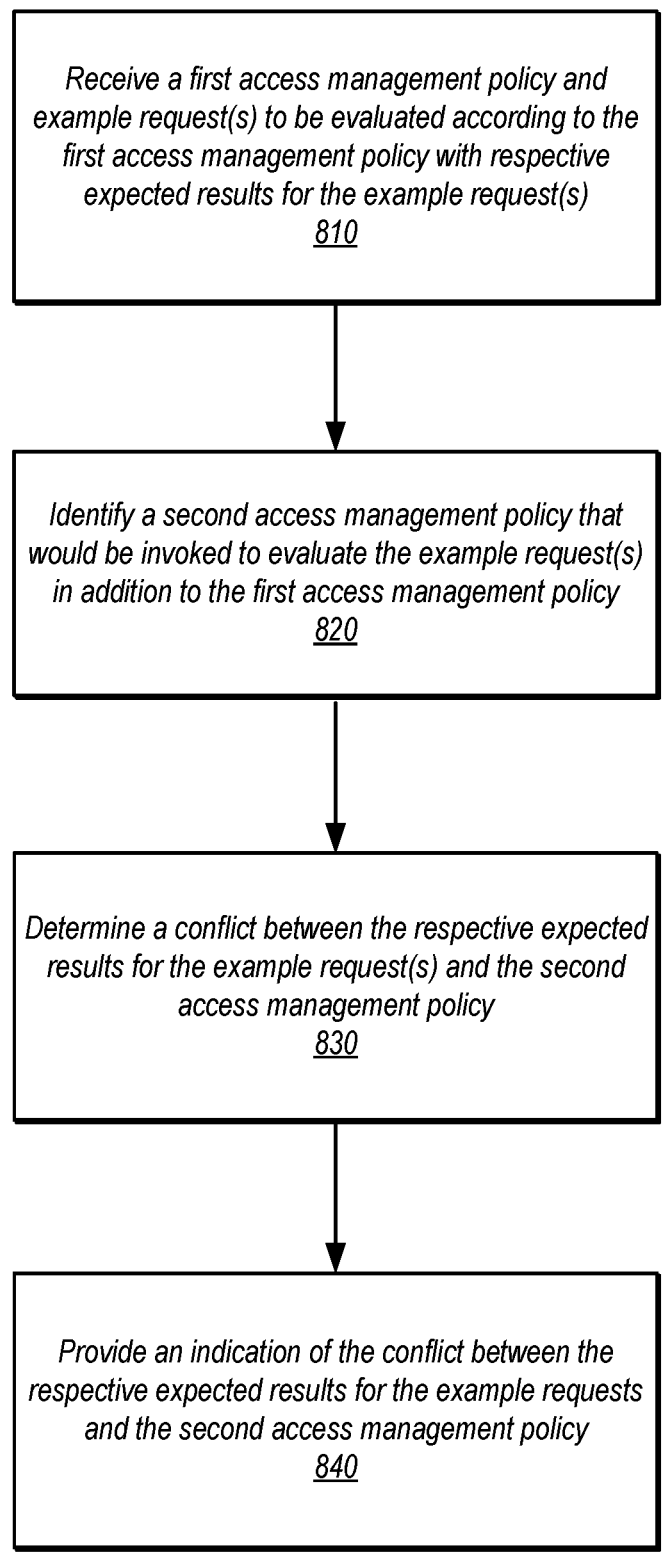
FIG. 8 is a high-level flowchart illustrating various methods and techniques to implement detecting conflicts between a generated access management policy and invoked access management policy, according to some embodiments.

As discussed above with regard to FIGS. 1 and 4, generating a policy to achieve expected results may implicate other policies which may also affect whether the expected results of for example requests made with respect to one policy are achieved. In some embodiments, an access management policy may include different types, such as identity policy (e.g., associated with a user, group, or role), a resource policy (e.g., associated with a resource hosted or implemented in a provider network such as provider network 200), session policy (e.g., limiting access features to a particular session), access control list policy, service control policy (e.g., service-wide policy attributes), permission boundary policy (e.g., describing permissions that can be granted in another policy, among other policies. In various embodiments, many different types of policies may be linked, associated, or otherwise invoked, such that a policy of a different type may affect the enforcement of a policy being generated (e.g., an account-wide or service-specific policy may have features that supersede or inform an identity based policy for one user or role within the account or service). FIG. 8 is a high-level flowchart illustrating various methods and techniques to implement detecting conflicts between a generated access management policy and invoked access management policy, according to some embodiments.

As indicated at 810, a first access management policy and example request(s) to be evaluated according to the first access management policy with respective results for the example request(s) may be received, in some embodiments. In various embodiments, the policy and example request(s) may be received along with a parameter or other indicator to perform a conflict check with respect to other policies.

As indicated at 820, a second access management policy that would be invoked to evaluate the example request(s) in addition to the first access management policy may be identified, in some embodiments. For example, a request evaluation may be performed by an identity and access management system which may according to the request identify any other policies applicable to the request. For example, service-wide or resource policies may be applicable depending on the resource being targeted in the request or account-wide policies may be identified according to an identity of the user in the request.

As indicated at 830, a conflict may be determined between the respective expected results for the example request(s) and the second access management policy, in some embodiments. For example, similar to the discussion above with regard to FIG. 7, allow and/or deny statements may be added (or modified) according to the requests and transformed into paths. Additionally, applicable paths for the requests may be generated from the second access management policy and included for evaluation. If the application of one path from the second policy blocks a path from the newly generated policy, then conflict may exist.

As indicated at 840, an indication of the conflict between the respective expected results for the example requests and the second access management policy may be provided, in some embodiments. For example, an interface for a policy generator may display a conflict by identifying the conflicting request and second policy. In some embodiments, a suggested correction may be provided. For example, an allow statement to be included in the second policy can be generated according to the blocking path of the second policy. In some embodiments, the interface may provide an option or element to submit a request to modify the conflict policy. In some embodiments, a permission check may be first performed to see if a user submitting the requested change to the second policy has permission to make the change. If the user does not have permission, a request to send a notification to a user or other owner of the second policy can be requested and sent, including the requested change to be made.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
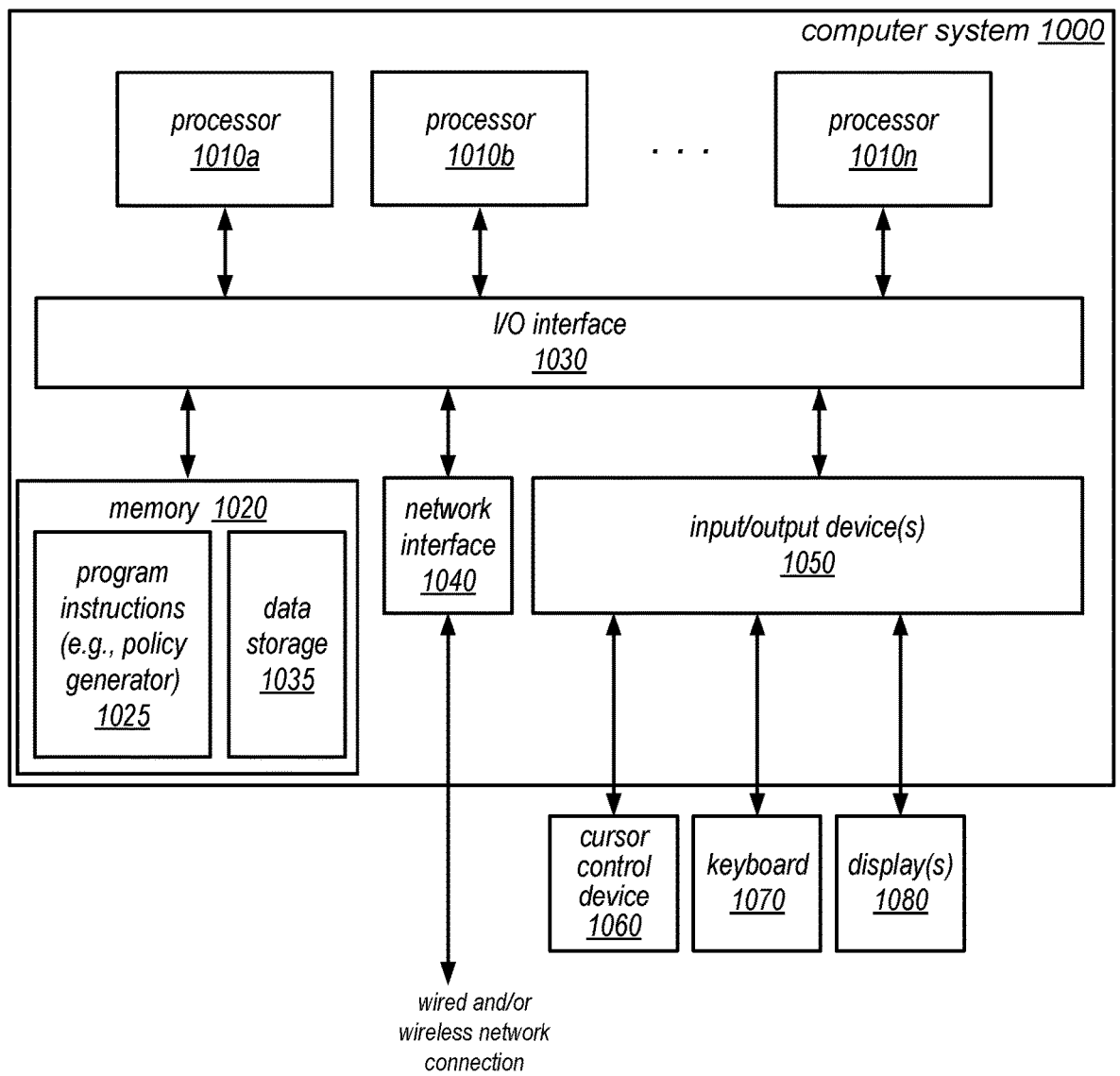
FIG. 9 illustrates an example system configured to implement the various methods, techniques, and systems described herein, according to some embodiments.

Embodiments of resource state evaluation of access control policies as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., policy evaluators and/or other features of identity and access control systems, services or other systems that implement resource state evaluation of access control policies) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within an identity and access management system may present identity and access management services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement an identity and access management system, the identity and access management system configured to:
   receive, via an interface of the identity and access management system, a request to generate a new access management policy from a provided access management policy and one or more example requests with respective expected results for the one or more example requests;
   responsive to the request to generate the new access management policy:
      determine one or more updates to the provided access management policy that cause the respective expected results for the one or more example requests to occur when the new access management policy, generated based on the determined one or more updates, is enforced;
      generate the new access management policy based on the determined one or more updates; and
      provide, via the interface, the generated new access management policy.

2. The system of claim 1, wherein to generate the new access management policy based on the one or more updates, the identity and access management system is configured to:
   convert a version of the provided access management policy into path form that includes the one or more updates;
   identify one or more simplifications to perform for the version of the provided access management policy from the path form;
   perform the one or more simplifications on the path form to generate a simplified path form; and
   convert the simplified path form of the version of the converted access management policy into a document form of the version of the access management policy to provide as the new access management policy.

3. The system of claim 2, wherein the one or more identified simplifications are performed according to a simplification precision parameter received as part of the request.

4. The system of claim 2, wherein the one or more simplifications identify one or more paths in the path form to merge that change semantics of the new access management policy.

5. A method, comprising:
   receiving, by an identity and access management system, an access management policy and one or more example requests to be evaluated according to the access management policy with respective expected results for the one or more example requests;
   determining, by the identity and access management system, one or more updates to the received access management policy that cause the respective expected results for the one or more example requests to occur when a new version of the access management policy based on the one or more updates is enforced; and
   generating the new version of the access management policy based on the one or more updates.

6. The method of claim 5, further comprising:
   converting, by the identity and access management system, the new version of the access management policy into path form;
   identifying, by the identity and access management system, one or more simplifications to perform for the generated new version of the access management policy from the path form;

performing, by the identity and access management system, the identified one or more simplifications on the path form to generate a simplified path form; and converting, by the identity and access management system, the generated simplified path form of the generated new version of the access management policy into a document form of the generated new version of the access management policy.

7. The method of claim 6, wherein the one or more simplifications are performed according to a received simplification precision parameter.

8. The method of claim 6, wherein the one or more simplifications identify one or more paths in the path form to merge without changing semantics of the generated new version of the access management policy.

9. The method of claim 6, wherein the one or more simplifications identify one or more paths in the path form to merge that change semantics of the generated new version of the access management policy.

10. The method of claim 9, further comprising providing, by the identity and management system, warning information that indicates a change in permissions corresponding to the change in the semantics of the generated new version of the access management policy.

11. The method of claim 5, further comprising:
generating, by the identity and access management system, a second new version of the access management policy that includes one or more simplifications applied to the generated new version of the access management policy; and
providing, by the identity and access management system, the generated new version of the access management policy and the generated second new version of the access management policy via an interface of the identity and access management system.

12. The method of claim 11, wherein generating the second new version of the identity and access management policy that includes one or more simplifications applied to the generated new version of the identity and access management policy, and providing the generated second new version, are performed in response to a request for another new version of the access management policy different than a previous request to generate the new version of the access management policy.

13. The method of claim 5, wherein the access management policy and the one or more example requests are received as part of a request to generate the new version of the access management policy, the request received via an interface for the identity and access management system and wherein the method further comprises providing, via the interface of the identity and access management system, the generated new version of the access management policy.

14. One or more non-transitory, computer-readable storage media, storing program instructions that when executed on or across one or more computing devices cause the one or more computing devices to implement:
receiving a request to generate a new access management policy from a provided access management policy and one or more example requests with respective expected results for the one or more example requests;
generating the new access management policy that causes the respective expected results for the one or more example requests to occur when the new of the access management policy is enforced; and
providing the generated new access management policy in response to the request.

15. The one or more non-transitory, computer-readable storage media of claim 14, wherein, in generating the new access management policy, the program instructions cause the one or more computing devices to further implement:
converting a version of the access management policy modified for the one or more example requests into path form;
identifying one or more simplifications to perform for the converted version of the access management policy from the path form;
performing the one or more simplifications on the path form to generate a simplified path form; and
converting the simplified path form of the version of the access management policy into a document form to provide as the new access management policy.

16. The one or more non-transitory, computer-readable storage media of claim 15, wherein the one or more simplifications are performed according to a received simplification precision parameter.

17. The one or more non-transitory, computer-readable storage media of claim 15, wherein the one or more simplifications identify one or more paths in the path form to merge without changing semantics of the generated new version of the access management policy.

18. The one or more non-transitory, computer-readable storage media of claim 15, wherein the one or more simplifications identify one or more paths in the path form to merge that change semantics of the generated new version of the access management policy.

19. The one or more non-transitory, computer-readable storage media of claim 14, wherein the one or more example requests comprise a positive request and a negative request.

20. The one or more non-transitory, computer-readable storage media of claim 14, wherein the one or more computing devices are implemented as part of an identity and access management service offered by a provider network that offers one or more other services that host one or more resources included in the one or more example requests.

* * * * *